Figures 1, 2:
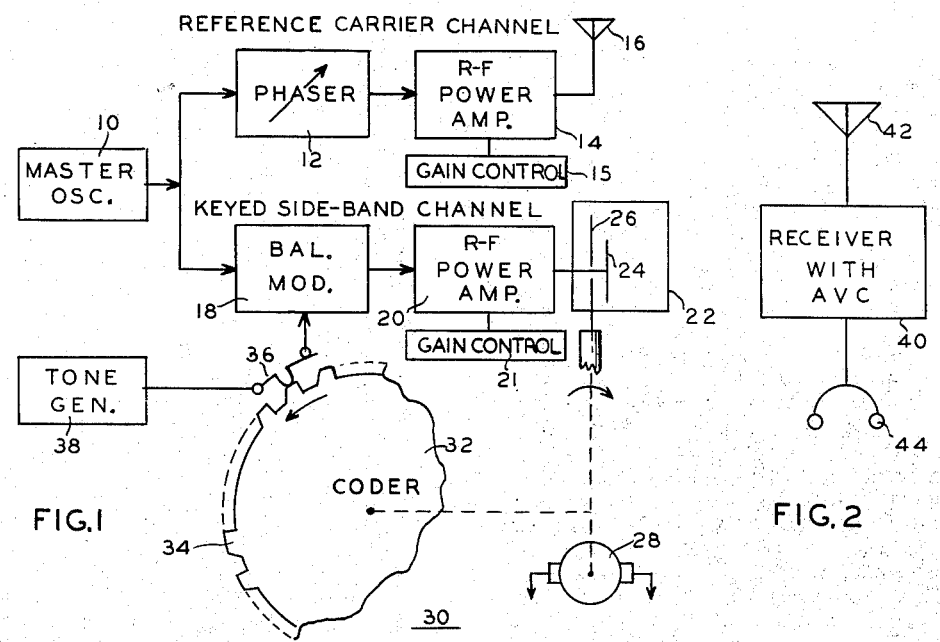

Sept. 2, 1952          P. B. TAYLOR          2,609,534

RADIO BEACON

Filed Aug. 24, 1944

INVENTOR.
PAUL B. TAYLOR
BY William D. Hall
ATTORNEY

Patented Sept. 2, 1952

2,609,534

UNITED STATES PATENT OFFICE 2,609,534

RADIO BEACON

Paul B. Taylor, Dayton, Ohio

Application August 24, 1944, Serial No. 551,050

13 Claims. (Cl. 343—106)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in radio signaling, particularly for the purpose of providing improved omnidirectional radio ranges or beacons.

In one prior system of this type, a sharp unidirectional beam of radio energy is rotated in azimuth at a relatively slow rate, say one revolution every two minutes. As said beam is rotated, it is modulated with a series of identifying code letters, a different letter being used for each of a plurality of directions. As the beam sweeps through a sector of space in which there is located an ordinary nondirectional receiver, the operator of such receiver will hear a series of successive code letters which vary in strength, the code letter received with maximum strength indicating to him the direction of origin of the received signal. Systems of this type permit the use of an ordinary communication receiver for direction determination, a factor which is of importance where space is at a premium and the amount of equipment utilized must therefore be kept at a minimum; as is the case with airborne equipment.

The above system is, however, subject to several limitations resulting from various factors at the point of reception, which cause a decrease in the accuracy of direction determination. For instance, if the receiver is equipped with automatic volume control (AVC) or is of the type which inherently provides limiter action, such as a super-regenerative receiver, the gradations in volume of the code signals heard will be more or less evened out, thereby reducing the accuracy of azimuth determination. Moreover, if the receiver is located on a rapidly moving craft such as an airplane, large changes in distance from the transmitter will occur before the beam thereof has swept through the sector involved, thus producing changes in field intensity of the received signals which bear no relation to the beam direction. Furthermore, if the antenna of such craft is not perfectly omnidirectional, changes in attitude of the craft, i. e., its orientation with respect to the direction of the signal origin, will also affect the received signal strength, so that the signal intensity may vary rapidly while the plane is changing its heading.

It is a principal object of this invention to provide an improved directional signaling system in which the above-mentioned difficulties are largely reduced or eliminated. It is a further object of the invention to provide an improved system of this type in which the intensity of the direction-indicating signal depends predominantly on the direction of the beamed signal and is largely independent of local factors affecting the intensity of said signal at the point of reception. Yet another object of the invention is to provide an improved omnidirectional radio range which will give accurate direction indication with a receiver having inherent limiting action or equipped with AVC.

Toward the attainment of these and other objects, the radio range signal is made up of at least two components having different frequency and directional characteristics. The intensity of the signal in the output of the receiver is made dependent upon the ratio of the amplitudes of both components at the receiver input. By providing the receiver with AVC, said output intensity is kept substantially independent of like variations in amplitudes of both components at the receiver input.

In accordance with a preferred embodiment of the invention, one component of the signal is an unmodulated carrier, transmitted over an antenna having a nondirectional or broadly-directional lobe pattern. The other component is a tone-modulated side-band signal, with suppressed carrier, transmitted over a continuously rotating antenna having a relatively sharp, preferably unidirectional lobe pattern. The side-band component is also keyed as the antenna is rotated to provide code signals indicative of the instantaneous direction of the axis of the lobe. As the lobe of the directional component sweeps through a receiver location, the modulation depth, and hence the intensity of the signal in the receiver output will be maximum when said axis points directly at the receiver. It is well known in the art that in a system in which carrier is added to side bands the maximum depth of modulation is obtained with given side bands when the carrier amplitude equals the sum of the side band amplitudes, and is in phase with the suppressed carrier of the side bands. Accordingly the sharpest maximum is obtained in reception when the unmodulated carrier wave has an amplitude not less than the sum of the amplitudes of the side bands at the maximum of the lobe. Preferably I make the amplitude of the signal of broader directivity in the direction of the signal of sharper directivity equal to the maximum amplitude found in the signal of sharper directivity, and of proper phase. In other directions it may taper off, but still must be kept large compared to the amplitude of the signal of sharp directivity in that direction.

In accordance with another embodiment of the invention, two carriers of different frequencies are generated. One is unmodulated and nondirectionally transmitted, while the other is suppressed-carrier modulated in the same manner as described above, and its side bands are close enough in frequency to be received in the same receiver, but far enough apart that the beats between the received carrier and side-bands are of such high frequency as to be either superaudible or substantially attenuated by the audio channels of the receiver. Only the beats between the side-band frequencies will be heard.

In accordance with still another embodiment of the invention, two carriers of different frequencies are separately transmitted. One is continuously and nondirectionally transmitted. The other is directionally transmitted and keyed to provide direction-indicating code signals. The two carriers are close enough in frequency to provide an audio beat which constitutes the received signal.

In all the above embodiments the reference carrier component may also be transmitted over a broadly-directional beam which is rotated in unison with the sharply directional beam, the latter being superposed upon the former. This permits a substantial saving in power of the carrier component.

For a better understanding of the invention, together with other and further objects thereof, reference is had to the following description taken in connection with the accompanying drawings, and its scope will be pointed out in the appended claims.

Figures 3, 4:
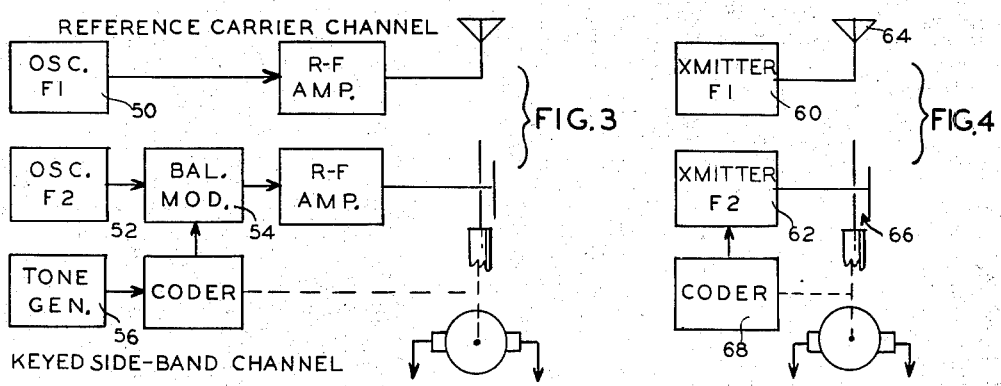
Figures 5, 6:
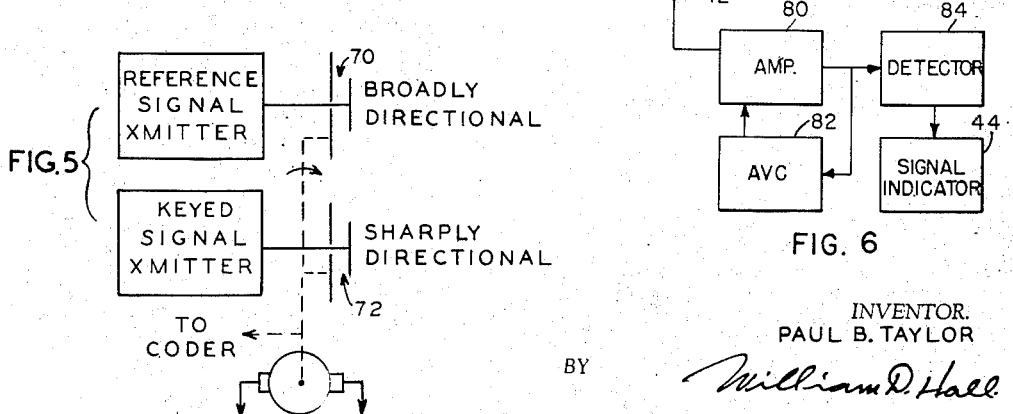

In the drawings:

Fig. 1 is a block diagram of a preferred embodiment of the radio range constituting my invention, Fig. 2 is a block diagram of a receiver suitable for use with system in Fig. 1, Figs. 3 and 4 are block diagrams of two further embodiments of my invention, Fig. 5 is a block diagram of a possible modification of the systems in Figs. 1–4, and Fig. 6 is a block diagram of a portion of Fig. 2, and shows a conventional AVC circuit which is part of the receiver.

Referring to Fig. 1, there is shown a radio range transmitter comprising a master oscillator 10, operating preferably in the 100–200 megacycle region or higher, which feeds, in parallel, a carrier channel and a side-band channel. The carrier channel provides one component of the signal and includes an adjustable phaser 12 and a tuned radio-frequency (R.-F.) power amplifier 14, the output of which is radiated by a nondirectional antenna 16. The side-band channel provides the other component of the signal and includes a carrier-suppressing balanced modulator 18, and a tuned R.-F. power amplifier 20, the output of which is radiated by a highly directional antenna 22, including one or more dipoles 24 and a reflector 26 to render the antenna lobe unidirectional. Reflector 26 may be parabolic if a single dipole is used, or it may be flat if a dipole array is used. The usual gain-control means 15 and 21 are provided for varying the power output of R.-F. amplifiers 14 and 20, respectively.

Antenna 22 is continuously rotated in azimuth at a relatively slow rate by a motor 28, which also rotates, in synchronism with the antenna, a coder 30, comprising a disc 32 having camming teeth 34 cut around its entire periphery to form predetermined code letters. For each direction that the antenna lobe points to, a separate code letter is used to identify to a listener the instantaneous direction of said antenna lobe. Camming teeth 34 serve to control a keying switch 36 which couples the output of an audio-frequency tone generator 38 to the balanced modulator 18 to modulate the carrier and produce modulation side-bands which are amplified by R.-F. amplifier 20 and radiated by directional antenna 22. The speed of rotation of the directional antenna is usually much lower than the frequency of the tone generator 38, said speed being unrelated to the modulation components of the transmitted wave.

Thus there is provided a radio-range transmitter in which antenna 16 transmits a nondirectional reference signal component in the form of an unmodulated carrier. Antenna 22 transmits, along a sharply-defined direction, a second signal component in the form of keyed side-bands of the tone modulation, with the carrier suppressed. By continuously rotating antenna 22, the azimuth of said sector is rotated. At the same time coder 30 will code-modulate the modulation side-band component so that distinctive code-signals are superimposed thereon, each of which is indicative of a given direction of transmission. To determine at a second point the direction of the signal from the beacon, an ordinary receiver 40 (Fig. 2) having a nondirectional antenna 42, is used. As more specifically shown in Fig. 6, such a receiver comprises an amplifier 80 to which the signals received by antenna 42 are applied. The output of amplifier 80 is applied to an AVC circuit 82 which develops a direct-current potential which is determined by the average amplitude of the wave in the amplifier output. This potential is applied to the grid of one or more of the amplifier tubes to maintain substantially constant the average amplitude of the amplifier output. The latter is now applied to a detector 84 which demodulates the signal which is in turn, applied to indicator 44. The receiver will always be excited by the nondirectional carrier component of the transmitter, but since said component is unmodulated, it will produce no output in the headphones 44. As the antenna 22 is rotated so that its lobe sweeps through the sector in which receiver 40 is located, the modulation side-bands will be impressed upon the receiver in varying intensity which is greatest when the axis of the antenna lobe passes through the receiver antenna. Said side-bands will now combine with the received carrier and yield an amplitude modulated signal in the receiver output which varies in intensity until it becomes maximum, at which time the direction to the transmitter can be identified by the operator by means of the code letter which then accompanies the signal.

By providing the receiver with conventional AVC which responds only to the reference carrier component, but not to the modulation component, any changes in the strength of the signal due to the local factors above mentioned will be compensated for, since the AVC will keep constant the average level of the carrier component, and in proper proportion the level of the modulation component which is at that moment superimposed thereon. Thus variation in direction of the transmitted signal varies only the ratio between the carrier and side-band components, i. e., the depth of modulation, and hence the loudness of the received signals. On the other hand, other conditions which will tend to vary the strength of both signal components will result in activation of the AVC circuit by the carrier component so that said variation will be compensated for.

It is important that the two components at the receiver have the proper amplitude and phase relation to yield an amplitude modulated signal. For this purpose, the relative amplitudes of the signals in both transmitter channels should be properly adjusted by the gain controls 15 and 21. Phaser 12 should also be adjusted to properly phase the carrier signal with respect to the side-band signal. Said phaser can be inserted at any point in either channel, or a portion of the phase adjustment can be provided for in both channels.

Fig. 3 shows another embodiment of the invention, in which the nondirectional reference component and the beamed component are of the different frequencies F1 and F2 generated by separate oscillators 50 and 52, respectively. The output of oscillator 52 is modulated by the tone generator 56 in a balanced modulator 54, which suppresses the carrier and yields only the modulation side-bands. In other respects this system is similar to that in Fig. 1. The frequencies F1 and F2 are sufficiently close to be received by the same receiver, but far enough apart that the beats between the carrier component F1 and the side-bands of the suppressed carrier component F2 in the receiver are so high as to be either superaudible or too high to be effectively transmitted by the audio circuits of the receiver. The side-band frequencies will, however, beat with each other to yield an audible signal which may be interpreted in that same manner as above described in connection with Fig. 1. The embodiment in Fig. 3 does not, however, need any adjustment in phase relation between the two signal components, and hence there is no need for a phaser such as 12 in Fig. 1. As in the first embodiment, the unmodulated reference component, provided by oscillator F1, controls the AVC action at the receiver, while the effective direction of the side-band component, provided by oscillator F2, controls the intensity of the receiver output to indicate the direction of signal transmission. In order to prevent apparent broadening of the beam by the AVC action of the receiver, the amplitude of the reference component should be greater than the sum of maximum amplitudes of the side-bands in the beamed component.

Fig. 4 illustrates a third embodiment of the invention, in which the two signal components are provided by two transmitters 60 and 62 operating at different frequencies F1 and F2. The output of transmitter 60 is unmodulated and radiated by a nondirectional antenna 64. The output of transmitter 62 is transmitted by the rotating directional antenna 66. No tone modulation is provided for the beamed component in this system, as is the case with the first two embodiments. The coder 68, which is rotated in synchronism with antenna 66, merely keys transmitter on and off in accordance with the various code signals. Frequencies F1 and F2 are close enough to provide an audio beat signal in the output of the receiver when both components are received, the intensity of said audio signal providing the indication of the direction of the transmitted signal. The time constant of the AVC circuit of the receiver used with this system should preferably be slow enough to avoid any substantial removal of the code modulations but fast enough to compensate for rapid changes in field intensity due to the aforementioned local factors. In order to minimize apparent broadening of the beam due to AVC action, the amplitude of the nondirectional component should be larger than that of the beamed component.

All the above described embodiments can be modified in a manner shown in Fig. 5. Instead of nondirectionally transmitting the reference component, the latter is also transmitted over a directional antenna 70 which is rotated in unison with the sharply directional antenna 72 which carries the keyed signal component. Both antennas have their lobes pointing in the same direction. Antenna 70 has, however, a directional flat-nosed lobe pattern which is considerably broader than that of said sharply-directional antenna 72, and of such extent that it is wide enough to cover the minor lobe sectors of antenna 72. This expedient permits a substantial saving in the power of the reference carrier component of the signal.

In all the above embodiments the nondirectional or broadly directional channel can be used to send a station-identifying signal and for telegraphic or telephonic communication purposes. Well known electrical methods involving stationary antennas can be used for rotating the beam in place of the mechanical methods described. It will be obvious that various changes and modifications may be made without departing from the spirit and scope of the invention as defined in the appended claims.

I claim:

1. A directional radio system comprising radio transmitting means and radio receiving means; said transmitting means comprising first and second antennas situated at substantially the same point, the second antenna being more sharply directional than the first, means for transmitting from said first antenna a wave without any modulation thereon, and means for transmitting from said second antenna a suppressed-carrier, amplitude-modulated wave; said radio receiving means comprising a relatively non-directional means for receiving and combining the wave radiated from both of said antennas to produce a resultant amplitude-modulated signal, an amplifying circuit upon which said resultant signal is impressed for amplifying said resultant signal, an automatic volume control circuit energized by the output of said amplifying circuit for controlling the gain thereof, said automatic volume control being predominantly responsive to the average amplitude of said resultant signal, and signal indicator means coupled to the output of said amplifying circuit.

2. A system as set forth in claim 1, wherein said first antenna is non-directional and said second antenna is unidirectional, means for continuously rotating the effective direction of said second antenna, and means for varying the amplitude modulation characteristic of the wave transmitted from said second antenna in synchronism with said rotation to provide a distinctive modulation for each effective direction.

3. A directional radio system comprising radio transmitting means and radio receiving means; said transmitting means comprising first and second antennas situated at substantially the same point, said second antenna being more sharply directional than said first antenna, means for providing first and second undamped waves, means for radiating said first wave without any modulation thereon from said first antenna, and means for suppressed-carrier modulating said second wave and for radiating it from said second antenna, whereby when both waves are combined they produce an amplitude-modulated wave; said radio receiving means comprising means for receiving and combining the waves radiated from both of said antennas to produce a resultant amplitude-modulated wave, an amplifying means upon which said resultant is impressed for amplifying said resultant wave, an automatic volume control circuit energized by the output of said amplifying means for controlling the gain thereof, said automatic volume control circuit being predominantly responsive to the average amplitude of said resultant wave, and signal indicator means coupled to the output of said amplifying means.

4. A system as set forth in claim 3, wherein said first antenna is substantially non-directional.

5. A system as set forth in claim 4, wherein said second antenna is unidirectional.

6. A system as set forth in claim 5, including means for continuously rotating the effective direction of said second antenna and synchronously varying the modulation of said second wave to provide a distinctive modulation for each effective direction.

7. A system as set forth in claim 6, wherein both of said waves are of the same frequency and cophasally transmitttd.

8. A system as set forth in claim 6, wherein said waves are of different frequency.

9. A directional radio system comprising radio transmitting means and radio receiving means; said transmitting means comprising a fixed-frequency undamped wave source, a pair of channels coupled in parallel to said source, a substantially non-directional antenna in one of said channels for radiating said wave without any modulation thereon, a source of audio-frequency signal, a balanced modulator in the other of said channels for modulating said wave with said signal while suppressing said carrier, a unidirectional antenna in the other of said channels for radiating the suppressed-carrier waves; means for continuously rotating said antenna and synchronously interrupting said audio-frequency signal to provide a distinctive code modulation for each distinct direction, both antennas being situated at substantially the same point, and means in at least one of said channels to so adjust the amplitude and phase relation of said waves that when both waves are combined they produce an amplitude-modulated wave; said radio receiving means comprising a relatively non-directional means for receiving and combining the waves radiated from both of said antennas to produce a resultant amplitude-modulated signal, an amplifying channel upon which said resultant signal is impressed for amplifying said resultant signal, an automatic volume control circuit energized by the output of said amplifying channel for controlling the gain thereof, said automatic volume control circuit being predominantly responsive to the average amplitude of said resultant signal, and signal indicator means coupled to the output of said amplifier means.

10. A system for radiating a modulated signal which when received produces a signal having a direction-dependent degree of modulation, said system comprising means for non-directionally radiating an unmodulated wave from a given point and means for unidirectionally radiating a suppressed-carrier modulated wave from substantially the same point, whereby when said waves are received and combined they produce a resultant signal having a direction-dependent degree of modulation, means for varying the effective direction of radiation of said modulated wave at a rate which is unrelated to the modulation components of said modulated wave, and means for synchronously varying a modulation characteristic of said modulated wave with each change in effective direction.

11. A system as set forth in claim 10, wherein said waves are of the same frequency.

12. A system as set forth in claim 11, wherein both waves are cophasally radiated.

13. A system as set forth in claim 10, wherein said waves are of different frequency.

PAUL B. TAYLOR.

REFERENCES CITED

The following references are of record in the file of this patent:

UNITED STATES PATENTS

| Number | Name | Date |
| --- | --- | --- |
| 833,034 | De Forest | Oct. 9, 1906 |
| 1,458,949 | Nichols | June 19, 1923 |
| 1,815,246 | Englund | July 21, 1931 |
| 1,922,677 | Greig et al. | Aug. 15, 1933 |
| 2,051,966 | Runge | Aug. 25, 1936 |
| 2,086,229 | Kotowski | July 6, 1937 |
| 2,257,320 | Williams | Sept. 30, 1941 |
| 2,279,031 | Cockerell et al. | Apr. 7, 1942 |
| 2,284,873 | Kemp | June 2, 1942 |

FOREIGN PATENTS

| Number | Country | Date |
| --- | --- | --- |
| 467,013 | Great Britain | June 9, 1937 |